(12) United States Patent
Biemer (10) Patent No.: US 12,333,868 B2
(45) Date of Patent: *Jun. 17, 2025

(54) AUTOMATICALLY IDENTIFYING DRIVERS

(71) Applicant: ARITY INTERNATIONAL LIMITED, Belfast (IE)

(72) Inventor: Edward A. Biemer, Eastbourne (GB)

(73) Assignee: ARITY INTERNATIONAL LIMITED, Belfast (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,377

(22) Filed: Aug. 14, 2023

(65) Prior Publication Data

US 2024/0037998 A1    Feb. 1, 2024

Related U.S. Application Data

(63) Continuation of application No. 17/566,912, filed on Dec. 31, 2021, now Pat. No. 11,763,607, which is a
(Continued)

(51) Int. Cl.
*G07C 5/00* (2006.01)
*B60K 35/80* (2024.01)
(Continued)

(52) U.S. Cl.
CPC .............. *G07C 5/008* (2013.01); *B60W 40/08* (2013.01); *G07C 5/08* (2013.01); *B60K 35/80* (2024.01);
(Continued)

(58) Field of Classification Search
CPC ......... G07C 5/008; G07C 5/08; B60W 40/08; B60W 2040/0809; B60W 2520/10; B60W 2520/105; B60K 35/80; B60K 2360/573
(Continued)

(56) References Cited

U.S. PATENT DOCUMENTS 5,798,949 A * 8/1998 Kaub .................... G08G 1/0104
708/101
6,879,969 B2 * 4/2005 Engstrom ............ G05B 13/027
706/20
(Continued)

FOREIGN PATENT DOCUMENTS

JP    2008222167 A    9/2008
JP    2010256943 A    11/2010
(Continued)

OTHER PUBLICATIONS

Sep. 19, 2016—(US) Office Action—U.S. Appl. No. 14/753,782, 30 Pages.
(Continued)

*Primary Examiner* — Luis A Martinez Borrero
(74) *Attorney, Agent, or Firm* — Polsinelli PC (57) ABSTRACT

One or more devices in a data analysis computing system may be configured to receive and analyze movement data and driving data, and determine driving trips and associated drivers based on the received data. Movement data may be collected by one or more mobile devices, such as smartphones, tablet computers, and on-board vehicle systems. Drivers associated with driving trips may be identified based on the movement data collected by the mobile devices, such as speed data, acceleration data, or distance data.

20 Claims, 3 Drawing Sheets

Related U.S. Application Data continuation of application No. 16/786,392, filed on Feb. 10, 2020, now Pat. No. 11,217,043, which is a continuation of application No. 15/727,242, filed on Oct. 6, 2017, now Pat. No. 10,600,258, which is a continuation of application No. 14/753,782, filed on Jun. 29, 2015, now Pat. No. 9,842,437.

(51) Int. Cl.
*B60W 40/08* (2012.01)
*G07C 5/08* (2006.01)

(52) U.S. Cl.
CPC .............. *B60K 2360/573* (2024.01); *B60W 2040/0809* (2013.01); *B60W 2520/10* (2013.01); *B60W 2520/105* (2013.01)

(58) Field of Classification Search
USPC ........................................................... 701/1
See application file for complete search history.

(56) References Cited

U.S. PATENT DOCUMENTS

| | | | | |
|---|---|---|---|---|
| 7,444,311 B2* | 10/2008 | Engstrom | ............ | G05B 13/027 |
| | | | | 706/20 |
| 7,657,501 B1* | 2/2010 | Brown | ................. | G06F 9/5083 |
| | | | | 707/999.002 |
| 7,912,796 B2* | 3/2011 | Engstrom | ....... | B60W 30/18181 |
| | | | | 706/21 |
| 8,527,473 B1* | 9/2013 | Brown | ................. | G06F 16/25 |
| | | | | 707/685 |
| 8,634,822 B2* | 1/2014 | Silver | .............. | G06F 16/24578 |
| | | | | 340/439 |
| 8,989,914 B1* | 3/2015 | Nemat-Nasser | ......... | G07C 5/08 |
| | | | | 701/1 |
| 9,087,058 B2* | 7/2015 | Neven | .................. | G06F 16/951 |
| 9,137,308 B1* | 9/2015 | Petrou | .................... | G06F 16/00 |
| 9,141,995 B1* | 9/2015 | Brinkmann | ............. | G07C 5/02 |
| 9,293,042 B1* | 3/2016 | Wasserman | ............. | G08G 1/09 |
| 9,298,575 B2 | 3/2016 | Tamari et al. | | |
| 9,349,228 B2* | 5/2016 | Ochsendorf | ............ | B60K 35/22 |
| 9,373,200 B2* | 6/2016 | Warren | .................. | G07C 5/008 |
| 9,373,203 B1* | 6/2016 | Fields | ................. | B60K 35/00 |
| 9,536,428 B1* | 1/2017 | Wasserman | ...... | H04N 21/41415 |
| 9,599,481 B2* | 3/2017 | Lord | ................. | G01C 21/3438 |
| 9,650,052 B2* | 5/2017 | Takahashi | ............. | B60W 40/08 |
| 9,754,425 B1* | 9/2017 | Iqbal | ...................... | G07C 5/008 |
| 9,842,437 B2* | 12/2017 | Biemer | .................. | G07C 5/008 |
| 9,995,584 B1* | 6/2018 | Kanevsky | ............. | G01C 21/12 |
| 10,065,643 B2* | 9/2018 | Ito | ........................ | B60W 30/16 |
| 10,204,528 B2* | 2/2019 | Truong | .................. | G07C 5/02 |
| 10,214,221 B2 | 2/2019 | Chen | | |
| 10,220,854 B2 | 3/2019 | Chen | | |
| 10,250,611 B2 | 4/2019 | Herrmann et al. | | |
| 10,373,257 B1* | 8/2019 | Iqbal | ................. | G06Q 30/0207 |
| 10,380,642 B2* | 8/2019 | Wasserman | ............... | E01F 9/00 |
| 10,387,967 B1* | 8/2019 | Hayward | ............... | G07C 5/008 |
| 10,423,982 B2* | 9/2019 | Wasserman | ............... | E01F 9/00 |
| 10,429,203 B1* | 10/2019 | Brandmaier | ........... | G01C 21/20 |
| 10,600,258 B1* | 3/2020 | Biemer | ................ | B60W 40/08 |
| 10,730,388 B1* | 8/2020 | Briggs | ................ | G07C 5/0816 |
| 10,785,604 B1* | 9/2020 | Kumar | ................. | G06Q 10/0639 |
| 10,902,521 B1* | 1/2021 | Kanevsky | .............. | G06Q 40/08 |
| 11,217,043 B2* | 1/2022 | Biemer | .................. | G07C 5/08 |
| 11,429,438 B2* | 8/2022 | Pope | .................. | G06F 12/0842 |
| 11,593,687 B2* | 2/2023 | Ohazulike | ............... | G07C 5/085 |
| 11,725,943 B1* | 8/2023 | Kanevsky | ................. | G07C 5/08 |
| | | | | 701/500 |
| 11,763,607 B2* | 9/2023 | Biemer | .................. | G07C 5/008 |
| | | | | 701/1 |
| 2002/0082806 A1* | 6/2002 | Kaub | ..................... | G08G 1/164 |
| | | | | 702/182 |
| 2002/0128751 A1* | 9/2002 | Engstrom | .............. | G06V 40/20 |
| | | | | 701/1 |
| 2005/0159851 A1* | 7/2005 | Engstrom | .............. | G06V 40/20 |
| | | | | 701/1 |
| 2007/0001831 A1* | 1/2007 | Raz | ....................... | G07C 5/0816 |
| | | | | 340/439 |
| 2007/0280505 A1* | 12/2007 | Breed | .................... | B60W 40/08 |
| | | | | 382/104 |
| 2008/0240130 A1* | 10/2008 | Oved | ....................... | H04L 12/18 |
| | | | | 370/401 |
| 2008/0240154 A1* | 10/2008 | Oved | ..................... | H04L 69/164 |
| | | | | 370/466 |
| 2009/0150314 A1* | 6/2009 | Engstrom | .............. | G06V 40/20 |
| | | | | 706/21 |
| 2010/0023223 A1* | 1/2010 | Huang | .................. | B60W 40/09 |
| | | | | 340/576 |
| 2013/0041623 A1* | 2/2013 | Kumar | .................... | G06Q 10/08 |
| | | | | 702/158 |
| 2013/0096731 A1* | 4/2013 | Tamari | ................ | G06F 11/3058 |
| | | | | 701/1 |
| 2014/0113619 A1* | 4/2014 | Tibbitts | ................. | G07C 5/0808 |
| | | | | 455/419 |
| 2014/0277830 A1* | 9/2014 | Kwon | ....................... | G07C 5/08 |
| | | | | 701/1 |
| 2014/0278574 A1* | 9/2014 | Barber | .................. | B60W 40/09 |
| | | | | 705/4 |
| 2014/0309849 A1* | 10/2014 | Ricci | .................... | G06Q 30/0265 |
| | | | | 701/33.4 |
| 2014/0310075 A1* | 10/2014 | Ricci | ...................... | G06F 3/0622 |
| | | | | 705/13 |
| 2015/0046167 A1* | 2/2015 | Carriere | .................. | G10L 15/26 |
| | | | | 704/270.1 |
| 2015/0046197 A1* | 2/2015 | Peng | ...................... | B60W 40/09 |
| | | | | 701/31.5 |
| 2015/0127390 A1* | 5/2015 | Bowne | ............... | G01C 21/3676 |
| | | | | 705/4 |
| 2015/0161827 A1* | 6/2015 | Getchius | .......... | G06Q 10/08355 |
| | | | | 701/519 |
| 2016/0001781 A1* | 1/2016 | Fung | ........................ | G07C 9/37 |
| | | | | 701/36 |
| 2016/0001782 A1* | 1/2016 | Fiedler | .................. | B60W 40/09 |
| | | | | 340/5.81 |
| 2016/0039426 A1* | 2/2016 | Ricci | ....................... | G08G 1/207 |
| | | | | 701/1 |
| 2016/0086285 A1* | 3/2016 | Jordan Peters | .. | G08G 1/096827 |
| | | | | 701/484 |
| 2016/0275625 A1* | 9/2016 | Biemer | ................... | G07C 5/008 |
| 2016/0335814 A1 | 11/2016 | Tamari et al. | | |
| 2016/0375908 A1* | 12/2016 | Biemer | .................. | G07C 5/008 |
| | | | | 701/1 |
| 2017/0039890 A1* | 2/2017 | Truong | ................. | G09B 19/167 |
| 2017/0070616 A1* | 3/2017 | DiMeo | ............... | G01C 21/3617 |
| 2017/0103467 A1 | 4/2017 | Biemer et al. | | |
| 2017/0116678 A1 | 4/2017 | Biemer et al. | | |
| 2018/0208204 A1* | 7/2018 | Chen | ..................... | G06F 1/1694 |
| 2018/0208208 A1* | 7/2018 | Chen | ..................... | B60R 16/037 |
| 2018/0270241 A1* | 9/2018 | Herrmann | .............. | H04L 63/102 |
| 2019/0111934 A1* | 4/2019 | Shin | ....................... | B60W 40/08 |
| 2019/0268647 A1 | 8/2019 | Wasserman | | |
| 2020/0184740 A1* | 6/2020 | Biemer | ..................... | G07C 5/08 |
| 2021/0029505 A1* | 1/2021 | Kumar | ................... | H04L 67/535 |
| 2022/0375275 A1* | 11/2022 | Biemer | .................. | B60W 40/08 |

FOREIGN PATENT DOCUMENTS

| | | |
|---|---|---|
| JP | 2012069037 A | 4/2012 |
| JP | 2013112324 A | 6/2013 |
| JP | 2013122653 A | 6/2013 |
| JP | 2015094727 A | 5/2015 |
| WO | WO-2012118702 A2 | 9/2012 |

OTHER PUBLICATIONS

Aug. 3, 2017—(US) Notice of Allowance—U.S. Appl. No. 14/753,782, 18 Pages.

Mar. 30, 2017—(US) Final Office Action—U.S. Appl. No. 14/753,782, 36 Pages.

(56) References Cited

OTHER PUBLICATIONS

Dec. 13, 2018—(US) Non-Final Office Action—U.S. Appl. No. 15/727,242 (006591.01625), 43 Pages.
Jun. 13, 2019—(US) Final Office Action—U.S. Appl. No. 15/727,242 (006591.01625), 45 Pages.
Jul. 6, 2020—(BR) Examination Report—Application No. BR112017028164-3 (006591.01670), 6 Pages.
Sep. 8, 2020—(AU) Office Action—Application No. lication No. 2017565299 (006591.01671), 7 Pages.
Apr. 16, 2021—(MX) First Office Action—MX/a/2017/016897 (006591.01672), 8 pages.
Jun. 8, 2021—(JP) Office Action—Application No. lication No. 2017565299 (006591.01671), 5 Pages.
International Preliminary Report on Patentability for International Application No. PCT/US2016/039240, mailed Jan. 11, 2018, 7 pages.
International Search Report and Written Opinion for International Application No. PCT/US2016/039240, mailed Sep. 26, 2016, 8 pages.
Decision to Grant for Japanese Patent Application No. 2023-084908 dated Mar. 19, 2024 (6 pages).

* cited by examiner

AUTOMATICALLY IDENTIFYING DRIVERS

This patent application is a continuation of U.S. patent application Ser. No. 17/566,912, entitled "Automatically Identifying Drivers" and filed on Dec. 31, 2021, which is a continuation of U.S. patent application Ser. No. 16/786,392, entitled "Automatically Identifying Drivers" and filed on Feb. 10, 2020, which is a continuation of U.S. patent application Ser. No. 15/727,242, entitled "Automatically Identifying Drivers" and filed on Oct. 6, 2017, which is a continuation of U.S. patent application Ser. No. 14/753,782 entitled "Automatically Identifying Drivers" and filed on Jun. 29, 2015. Each of these applications is hereby incorporated by reference in its entirety herein.

TECHNICAL FIELD

Various aspects of the disclosure generally relate to systems and methods of collecting and analyzing driving data to determine the identity of a driver. Specifically, various aspects relate to systems and methods of receiving and analyzing movement data collected by sensors and identifying driving trips based on the movement data to determine the identity of a driver.

BACKGROUND

The ability to collect and analyze driving data and driving behaviors associated with vehicles and drivers has many valuable applications, for example, relating to vehicle and driver insurance, vehicle financing, product safety and marketing, government and law enforcement, and various other applications in other industries. For example, an insurance company may offer a safe driving discount, and a financial institution may offer financing incentives to customers based on driving behavior. Law enforcement or governmental personnel may collect and analyze driving data to identify dangerous driving roads or times, detect moving violations and other unsafe driving behaviors. In other cases, driving data may be used for navigation applications, vehicle tracking and monitoring applications, and vehicle maintenance applications, product sales and targeting advertisement applications, among others.

Vehicle-based computer systems, such as on-board diagnostics (OBD) systems and telematics devices, may be used in automobiles and may be capable of collecting various movement data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Such information may also be collected via the telematics device. However, a single vehicle may be used by multiple different drivers, and conversely, a single driver may drive multiple different vehicles. Accordingly, there is a need to determine based on the collected movement data whether the person associated with the movement data is the driver of the vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, apparatuses, computer-implemented methods, and computer-readable media for receiving and analyzing movement data and identifying driving patterns and drivers based on the movement data. In some cases, the movement data may correspond to acceleration data, speed data, or other movement data collected by various movement sensors in one or more mobile devices, such as smartphones, tablet computers, and on-board vehicle systems.

According to some aspects of the disclosure, driving patterns may be determined based on statistical analyses of the movement data. Trip attributes such as number of stopping points during a trip, number of turns, acceleration rate, deceleration rate, time of data etc. may be used to determine driving patterns. After determining a driving pattern, the pattern may be compared to one or more additional previously-stored driving patterns associated with a plurality of different drivers to determine the driver.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
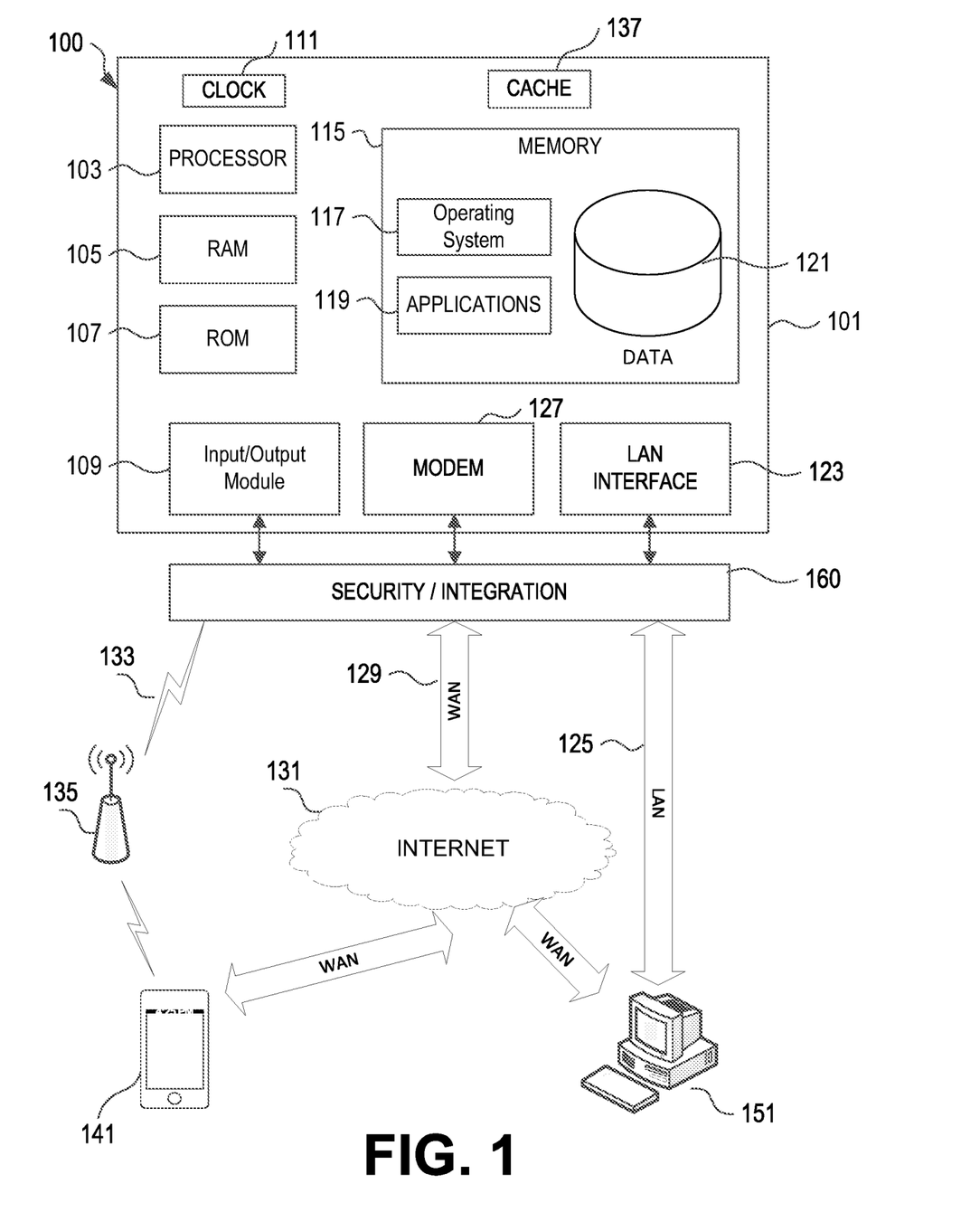
FIG. 1 illustrates a network environment and computer systems that may be used to implement aspects of the disclosure.

FIG. 1 illustrates a block diagram of a computing device (or system) 101 in a computer system 100 that may be used according to one or more illustrative embodiments of the disclosure. The device 101 may have a clock 111 configured to record time of day and a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices, such as a mobile computing device or a driving data analysis server, configured as described herein for receiving and analyzing movement data from mobile device movement sensors, and identifying driving patterns and drivers associated with the movement data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. Certain devices/systems within a movement data/driving data analysis system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., an insurance provider server 101, a movement data/driving data analysis device 101, etc.), in order to store and/or execute a movement data analysis software application, receive and process sufficient amounts of movement data from various sensors at a determined data sampling rate, and analyze movement data to identify driving patterns and determine associated drivers, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, to execute a movement data analysis software application that receives and stores data from mobile device movement sensors, analyzes the movement data, and determines driving patterns and associated drivers based on the movement data.

The computing device (e.g., a mobile computing device, a driving data analysis server, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, on-board vehicle computing systems, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, portable customer computing devices, on-board vehicle computing systems, etc.) via one or more network devices 135 (e.g., base transceiver stations) in the wireless network 133.

Also illustrated in FIG. 1 is a security and integration layer 160, through which communications may be sent and managed between the device 101 (e.g., a user's mobile device, a driving data analysis system, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a driving data analysis server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as driving data analysis server 101. For example, layer 160 may correspond to one or more dedicated web servers and network hardware in an organizational datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in the computing system 100 may include secure and sensitive data, such as movement data, driving pattern data, and/or driving behavior data associated with a driver or vehicle. Therefore, it may be desirable to protect transmissions of such data by using secure network protocols and encryption, and also to protect the integrity of the data when stored on in a database or other storage in a mobile device, driving data analysis server, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., movement data, location data, driving behavior data, etc.) between the various devices 101 in the system 100. Web services built to support system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers 101 and various clients 141 and 151 (e.g., mobile devices, data analysis servers, etc.). SSL or TLS may use HTTP or HTTPS to provide authentication and confidentiality. In other examples, such web services may be implemented using the WS-Security standard, which provides for secure SOAP messages using XML, encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

As shown in FIG. 1, various elements within memory 115 or other components in system 100, may include one or more caches 137, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a movement data database, a driving pattern database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of movement data and driving data collection and analysis systems, such as faster response times and less dependence on network conditions when transmitting/receiving movement data analysis software applications (or application updates), movement data, driving pattern data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within a movement data and/or driving data analysis system 100 (e.g., movement data analysis software applications), including computer executable instructions for receiving and storing movement data from mobile device sensors, analyzing the movement data to identify driving patterns and drivers associated with the movement data, and performing other related functions as described herein.

Figure 2:
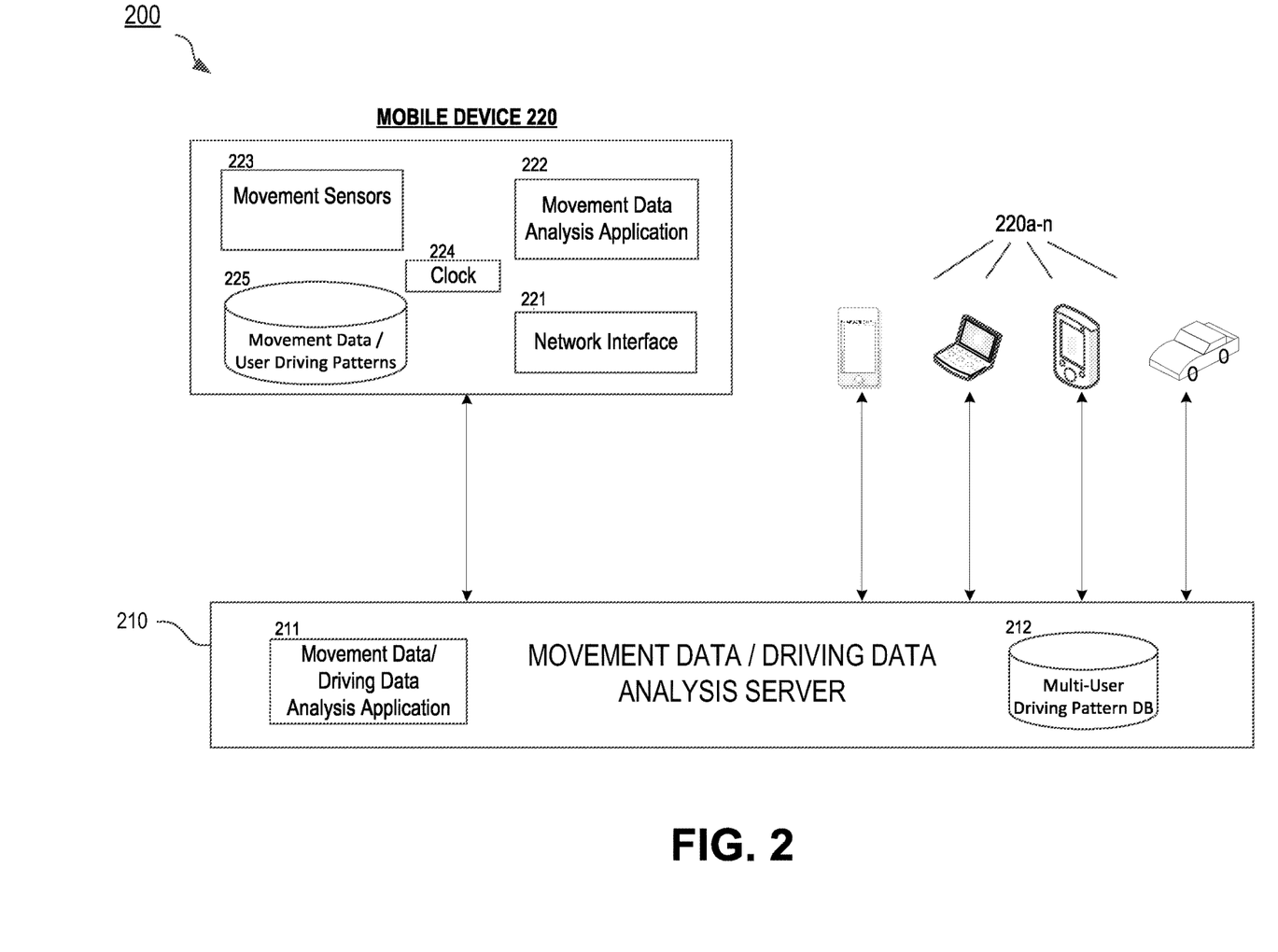
FIG. 2 is a diagram illustrating the components of an example movement data and driving data analysis system, according to one or more aspects of the disclosure.

FIG. 2 is a diagram of an illustrative movement data/driving data analysis system 200. In this example system diagram, a movement data/driving data analysis server 210 may communicate with a plurality of different mobile computing devices 220, which may include, for example, mobile user devices (e.g., smartphones, personal digital assistants, tablet and laptop computers, etc.), on-board vehicle systems, and any other mobile computing devices. Each component of a movement data/driving data analysis system 200 may include a computing device (or system) having some or all of the structural components described above for computing device 101. Additionally, although not shown in FIG. 2, any movement data/driving data analysis system 200 described herein may include various non-vehicle roadway infrastructure devices, such as toll booths, rail road crossings, traffic cameras, and road-side traffic monitoring devices. In various examples, the movement data/driving data analysis servers 210 and/or mobile computing devices 220 may be configured to communicate with such infrastructure devices, which may serve as additional data sources for movement data and/or driving data. For instance, vehicle speed, acceleration, and the like, may be obtained by road-side traffic monitoring devices and transmitted to one or more mobile computing devices 220 and/or movement data/driving data analysis servers 210.

The data analysis server 210 may be, for example, a computer server having some or all of the structural components described above for computing device 101. As described below in more detail, in some cases the data analysis server 210 may be configured to provide movement data analysis software applications to various mobile computing devices 220. The data analysis server 210 also may be configured to receive and analyze movement data (which may or may not correspond to driving data) from mobile computing devices 220, attempt to identify driving patterns based on the received movement data, and use driving patterns to identify drivers and other driving characteristics associated with the movement data. Therefore, in some embodiments, the server 210 may include one or more movement data and/or driving data analysis software applications 211, and one or more driving pattern databases 212. As described below in more detail, the server 210 may distribute a first software application 211 to mobile devices 220, for example, a movement data analysis application 211 (which may be stored as application 222 on the mobile device 220). The movement data analysis application 222 may operate on the mobile device 220 to analyze movement data and determine driving patterns within the movement data. A second software application 211 operating on the server 210, may be configured to receive and analyze the driving pattern data from the movement data analysis application 222 on the mobile device 220, and to identify a driver for the driving trip by determining and matching an observed driving pattern to previously-stored driving pattern in the driving pattern database 212.

In order to perform the functionality described above, and the additional functionality discussed in more detail below, the server 210 may include one or more processing units (e.g., single-core, dual-core, or quad-core processors, etc.) having a minimum sufficient bit size (e.g., 32-bit, 64-bit, 96-bit, 128-bit, etc.) and minimum required processor speeds (e.g., 500 MHz, 1 GHz, etc.), and sufficient volatile and nonvolatile memory (e.g., at least 256 MB of RAM, at least 5 GB of memory, etc.), in order to store movement data/driving data analysis applications (e.g., including various different versions, upgrades, etc.), establish communication sessions with and distribute applications to various mobile computing devices 220, and receive and analyze movement data/driving data from the mobile computing devices 220. Additionally, as described below, private and secure data may be transmitted between the data analysis server 210 and various mobile computing devices 220, such as private location data, movement data, driving behavior data, and personal driver/customer data, etc. Therefore, in some embodiments, server 210 may include various security and/or integration components (e.g., web servers, authentication servers) and/or various network components (e.g., firewalls, routers, gateways, load balancers, etc.). The server 210 also may provide and/or require communications over certain secure protocols or encryption techniques (e.g., FTP or SFTP, PGP, HTTP or HTTPS, SOAP, XML encryption, etc.), in order to protect the private or secure data transmitted between the server 210 and various mobile computing devices 220.

The movement data/driving data analysis system 200 in these examples may also include a plurality of mobile computing devices 220. As discussed below, in some embodiments, mobile computing devices 220 may receive and execute a movement data analysis software application 222 from the server 210 or other application provider (e.g., an application store or third-party application provider). As part of the execution of the movement data analysis software application 222, or implemented as separate functionality, mobile computing device 220 may receive and analyze movement data from movement sensors 223 of the mobile device 220, identify driving patterns based on the received movement data, and use driving patterns to identify drivers associated with the movement data. Accordingly, in some embodiments, a mobile computing device 220 may include one or more processing units having a minimum sufficient bit size (e.g., 32-bit, 64-bit, etc.) and minimum required processor speeds (e.g., 233 MHz, 500 MHz, etc.), and sufficient volatile and nonvolatile memory (e.g., at least 256 MB of RAM, at least 1 GB of memory, etc.), in order to store and execute one or more such movement data analysis software applications, and to establish communication sessions with a data analysis server 210 and/or various other devices (e.g., on-board vehicle systems, other mobile devices 220, etc.) to transmit or receive movement data, driving pattern data, etc. Additionally, mobile computing devices 220 may receive and transmit private or secure data, such as private location data, movement data, and driving behavior data, and personal driver/customer data, etc. Therefore, in some embodiments, mobile computing devices 220 may include various network components (e.g., firewalls, routers, gateways, load balancers, etc.), and may provide and/or require communications over certain secure protocols or encryption techniques (e.g., FTP or SFTP, PGP, HTTP or HTTPS, SOAP, XML encryption, etc.), in order to protect the private or secure data transmitted between the mobile device 220 and other devices.

Mobile device 220, which may be a smartphone, personal digital assistant, tablet computer, on-board vehicle system, etc., may include some or all of the elements described above with respect to the computing device 101. In this example, mobile device 220 includes a network interface component 221, which may include various network interface hardware (e.g., LAN interfaces, WAN modems, or wireless transceivers, etc.) and software components to enable mobile device 220 to communicate with one or more movement data/driving data analysis servers 210, other mobile devices 220, and various other external computing devices (e.g., application stores, third-party driving data servers, etc.). As shown in FIG. 2, a movement data analysis software application 222 may be stored in the memory of the mobile device 220. The movement data analysis software application 222 may be received via network interface 221 from server 210 or other application provider (e.g., an application store). In different examples, movement data analysis software application 222 may or may not include various user interface screens, and may be configured to run as a user-initiated application or as a background application. For instance, as discussed below, there may be an initial training period during which a user of the mobile device 220 interacts with user interface screens of the movement data analysis software application 222 to establish predetermined driving patterns based on training data. In such cases, the movement data analysis software application 222 may be a user-initiated application during the training period, but may (optionally) switch to execute as a background application after the training period over. When the movement data analysis software application 222 executes as a background application, it may be automatically initiated by the mobile device 220 (e.g., by the operation system), and may be configured continuously or periodically collect movement data, identify driving patterns, and perform pattern matching and other functions described herein. When operating as a background application 222, these functions may be performed automatically, without any specific user input to launch the movement data analysis software application 222 or perform the functionality of the application described herein.

Mobile computing devices 220 may include one or more movement sensors 223 configured to detect, generate, and collect movement data when the device 220 is moved. Movement sensors 223 may include, for example, accelerometers, speedometers, compasses, and gyroscopes. Additional movement sensors 223 may include certain sensors that might not be specifically designed to detect movement, but nonetheless may be used to detect movement by collecting and analyzing the sensor data over time, for example, cameras, proximity sensors, and various wireless network interfaces capable of detect access to different data networks, mobile networks, and other mobile devices (e.g., via Bluetooth). Different mobile devices 220 may include different sets of movement sensors 223. For instance, one smartphone may include only an accelerometer and a clock to collect and store device acceleration data and corresponding time data, while another smartphone or vehicle on-board computer may include an accelerometer, clock 224, speedometer, and compass (to collect speed and directional data), etc.

The memory of the mobile device 220 also may include one or more databases or other storage arrangements 225. Databases 225 may be configured to receive and store, for example, movement data collected by the movement sensors 223 of the mobile device 220, before that data is analyzed using the movement data analysis software application 222. In some cases, database 225 also may store the driving pattern data for one or more users of the mobile device 200. Driving pattern data, discussed in more detail below, may include one or more sets of movement data samples or calculations that may be used to identify a particular driver associated with observed driving data. Database 225 may store driving pattern data for the device owner and/or other devices users (e.g., family members, friends, and/or frequent users of the device 200). In some cases, multiple driving patterns may be stored for the same user. For instance, a driver may have different observable driving patterns when driving different cars (e.g., the family minivan versus the convertible), driving with different people (e.g., driving alone versus driving with family members), driving at different times/locations (e.g., driving to work versus on the weekend), driving during different seasons/conditions (e.g., summer versus winter driving), or driving in a caravan (e.g., leading or following other known drivers). In some examples, the driving data database 225 may exist within the application memory for the movement data analysis software application 222, and in other examples may be stored separately as persistent data within the device memory.

As shown in FIG. 2, in certain examples, a mobile device 220 may be an on-board vehicle system. In these examples, the on-board vehicle system 220 may correspond to a telematics device, vehicle computer, and/or on-board diagnostics systems. The on-board vehicle system 220 may include some or all of the elements described above with respect to the computing device 101, and may include similar (or the same) components to those in other mobile user devices 220 (e.g., smartphones, tablet computers, etc.). For on-board vehicle systems 220, movement sensors 223 may further include the various vehicle sensors, including hardware and/or software components configured to receive vehicle driving data collected by the various vehicle sensors. For example, vehicle sensors may detect and store data corresponding to the vehicle's speed, distances driven, rates of acceleration or braking, and specific instances of sudden acceleration, braking, turning, and swerving. Sensors also may detect and store data received from the vehicle's internal systems, such as headlight usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Additional vehicle sensors may detect and store data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. Certain vehicles also may include cameras and/or proximity sensors capable of recording conditions inside or outside of the vehicle, as well as sensors configured to collect data associated with a driver's movements or the condition of a driver, for example, sensors that monitor a driver's movements, such as the driver's eye position and/or head position, etc. Additional safety or guidance-assistance features may be included in some vehicles, detecting and storing data such as lane departures, activation of adaptive cruise control, blind spot alerts, etc.

In still other examples, the mobile device 200 may be a user device as described above (e.g., a smartphone, personal digital assistant, or tablet computer, etc.), and also may include a vehicle interface component to allow the mobile device to establish communication with an on-board vehicle system. For example, either the mobile device 220 or a vehicle may be implemented with hardware (e.g., an input port or docking station) and/or software (e.g., network interfaces, secure protocols and encryption, etc.), and may be designed and configured to establish communication (using a wired or wireless connection) between the mobile device 220 and an on-board vehicle system. For example, a smartphone or tablet computer 220, which is often carried by a user, may include an on-board vehicle system interface to detect and/or connect to an on-board vehicle system whenever the user is driving (and/or riding as a passenger) in a vehicle. After a mobile device 220 establishes communication with an on-board vehicle system, which may be a telematics device, on-board diagnostic system, vehicle navigation device, or other vehicle computer system, the mobile device 220 may receive vehicle sensor data collected by various vehicle sensors. Thus, non-vehicle based mobile devices 220 (e.g., smartphones or tablet computers) may use vehicle interfaces to receive some or all of the same vehicle sensor data and driving data that is accessible to on-board vehicle systems 220, discussed above.

The movement data collected by the movement sensors 223 of the mobile device 220, or received from another the mobile device 220, may be stored in the memory of the mobile device 220 and/or transmitted to the server 210. As described below in reference to FIG. 3, this movement data may be analyzed by the mobile device 220 and/or by server 210 (e.g., using a movement data analysis software application) to determine when the movement data corresponds to a driving pattern, and using driving patterns to determine a driver and other characteristics of a driving trip. For instance, mobile device 220 or computing device 101 may by a standalone device capable of performing all of the functions described throughout this disclosure.

Although the examples described below in reference to FIG. 3 primarily refer to certain types of movement data, such as acceleration data, speed data, and time data, it should be understood that the movement data analyzed may include additional types of data such as rotation data, direction data, and relative location data, and any other movement data that may be determined from by the sensors 223 of a mobile device 220.

In an aspect of the disclosure, a driver may be determined from a determined driving pattern using only a subset of all of the data collected. In addition, in various embodiments, certain data such as absolute location information may not be used or excluded from the determination of driver identity and/or driving patterns. For example, time of day information may be used to calculate driver identity and driving patterns without using absolute location information (i.e. GPS location data).

Figure 3:
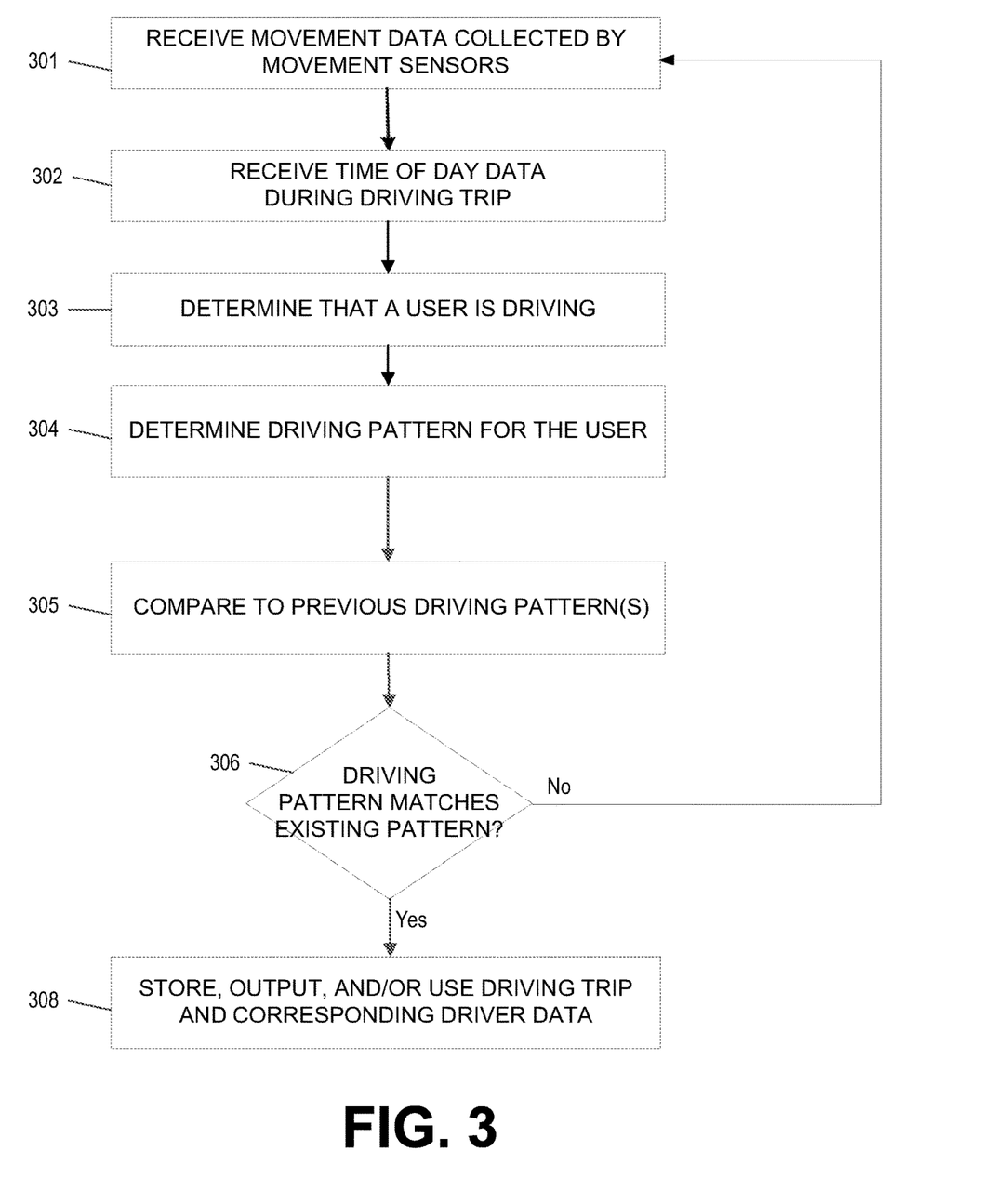
FIG. 3 is a flow diagram illustrating an example process of determining a driving pattern based on movement data, and comparing the driving pattern to one or more previously stored driving patterns, according to one or more aspects of the disclosure.

Referring to FIG. 3, a flow diagram is shown illustrating a process of receiving movement data collected by the movement sensors of a mobile device 220, and analyzing the movement data to identify driving patterns and associated drivers. The steps and various functionality described in reference to FIG. 3 may be performed by a mobile device 220, a movement data/driving data analysis server 210, or a combination of one or more mobile devices 220 and/or servers 210.

In step 301, a set of movement data is received at a computing device, for example, a mobile device 220 or a movement data/driving data analysis server 210. The movement data may correspond to the data collected by movement sensors 223 of a mobile device 220, such as acceleration and speed along with any other movement data discussed above in reference to FIG. 2. For embodiments in which a movement data analysis is performed on a mobile device 220, step 301 may include the mobile device 220 receiving and locally storing the movement data from its various movement sensors 223. For embodiments in which a movement data analysis is performed on a separate server 210, step 301 may include one or more mobile devices 220 collecting, formatting, and transmitting movement data to the server 210, which may receive and store the movement data from the mobile device(s) 220.

In step 302, time of day data may be received at mobile device 220 or movement data/driving data analysis server 210. The time of day data may be associated with the received movement data. In an embodiment, the time of day data may be received from a clock or other timing device associated with mobile device 220.

In step 303, mobile device 220 or movement data/driving data analysis server 210 may determine that the data received is associated with a driver and not a passenger of a vehicle. In an embodiment, movement data/driving data analysis server 210 may determine if the data is associated with a vehicle driver based on sensor data which may include visual, audio, or biometric data. In another embodiment, microphones, vehicle cameras, non-vehicle based traffic cameras, road-side traffic monitoring devices, and/or other roadway infrastructure may be used to determine if the user is the driver of the vehicle or passenger.

In step 304, mobile device 220 or movement data/driving data analysis server 210 may determine a driving pattern for the user. In an embodiment, a driver may be identified by a particular driving pattern through statistical analysis. For instance, 98 percent of the time a particular driver may approach a stop sign in the same manner. As an example, a particular driver may hard brake just before stopping at each stop sign.

In an aspect of the disclosure, a user's driving pattern may be thought of as a fingerprint as each driver exhibits various driving tendencies. These tendencies may include but not limited to frequent braking, fast decelerations or accelerations, typical driving times (day versus night), distance of trips, number of turns on a driving trip, average speed, driving/not driving in various weather conditions, braking characteristics, wearing of seat belts, radio operation, and driving behavior. Additional driving characteristics that may be exhibited by a driver may include but is not limited to vehicle rpm, idling time, speed, vertical/horizontal acceleration, start and end time of trip.

In another aspect of the disclosure, a driver may have frequent identical driving trip events. For instance, a student "X" may leave his/her house every Monday through Friday at 8:15 am to arrive at school on time at 9:00 am. This student may take the exact same route to and from school each day. Each day the vehicle is driven to school, the number of right and left turns for each driving trip may be the same. Similarly, the mileage and driving time for each driving trip may also be very close within a reasonable tolerance. Such a consistent driving pattern may be associated with student "X" based on a number of such identical driving trips.

In an embodiment, a driving pattern may be generated by determining stopping points and the total number of turns with the received movement data. In some cases, a stopping point during a driving trip may correspond to a stop sign, stoplight, or other intersection stopping point, yielding or merging in traffic, stop-and-go traffic conditions, etc. Additionally, parking a vehicle for an extended period of time during a driving trip, or at the end of a driving trip, may be a stopping point. In an embodiment, driving patterns may be based on speed data, acceleration or braking data, or other movement data occurring during a driving trip.

In an embodiment, in order to detect a stopping point during a driving trip, a movement data analysis software component (e.g., an application) may be executed to analyze input movement data, such as accelerometer and/or speed data, and may output data corresponding to one or more instances of a stopping point during a driving trip. For instance, a movement data analysis software application may conclude that a stopping point has occurred when a speedometer in a mobile device 220 (e.g., smart phone, tablet computer, or vehicle on-board computer, etc.) indicates a speed of zero, or near zero within a predetermined threshold (e.g., less than 0.5 miles-per-hour, less than 1 mile-per-hour, etc.). In other examples, a movement data analysis software application may conclude that a stopping point has occurred when an accelerometer in a mobile device 220 indicates an acceleration equal to zero for a predetermined minimum time threshold (e.g., 0.5 seconds, 1 second, 2 seconds, etc.). Although an acceleration sensor reading of zero does not necessarily indicate a velocity of zero, this will commonly be the case during any real-world driving trip, especially when acceleration is measured at zero over a period of time (e.g., 0.5 seconds, 1 second, 2 seconds, etc.), and thus the analysis in step 302 may include acceleration data without speed data in some cases. In still other examples, a combination of speed data and acceleration data may be used to identify stopping points during a driving trip (e.g., time t at which acceleration (a)=0 and velocity (v)=0).

Thus, in some cases, stopping points during a driving trip may be determined based only on speed and/or acceleration data. However, in other examples, stopping points may be determined based on additional data such as rotation rate data, vehicle operation and control data (e.g., received from vehicle sensors), and other data relevant to determining a stopping point during a driving trip. In still other examples, cameras or proximity sensors of a mobile device 220 may be used to identify and/or classify stopping points (e.g., by detecting stop signs, stop lights or determining a movement stop based on the image or proximity data).

Additionally, in some examples, traffic data, driving route data, weather data, and/or additional types of data may be used to select specific stopping points during a driving trip. For instance, certain stopping points during a driving trip, and the braking and acceleration that occur before and after the stopping points may be affected by external factors such as traffic, weather, time of day, season, or other external factors. In some cases, stopping points that are sensitive to such external factors (e.g., stop-and-go traffic, sudden braking caused by pedestrian or bicyclist, etc.) may be excluded and only those stopping points may be used which are deemed less dependent on external factors and more so on the driver's acceleration and braking behaviors. For instance, certain specific time and space localities may be selected, such as neighborhood stop signs or stoplights on less crowded roads, which are deemed not to have relevant traffic or weather considerations for the evaluation of acceleration and braking patterns.

In an embodiment, a driving pattern may be determined based on the current driving data collected in steps 301 and 303 and additional data such as the number of left/right turns made during the driving trip may be compared to one or more driving patterns previously determined and stored data in databases (e.g., 212 and 225). The driving pattern comparisons in step 305 may be used to identify a driver, a driver-vehicle combination, and/or additional driving variables or conditions (e.g., weather, time of day, driving route, etc.), by matching the observed (i.e., current) driving pattern to one or more predetermined driving patterns.

In an embodiment, driving data analysis server 210 (e.g., an insurance provider server 210 or other organizational server 210) may store the transmitted driving pattern and/or additional driving data. In some cases, a server 210 may receive driving patterns and driving data from a plurality of different mobile devices 220.

In step 306, if one or more driving patterns are identified as matches corresponding to a driver, vehicle, and/or other driving factors (306:Yes), then the corresponding driver/vehicle/driving factor data, along with various other driving trip data may be stored or output via the server 210, mobile device 220, or other computing device in a movement data or driving data analysis system in step 308. Depending on which previously stored driving pattern(s) were matched driving data analysis server 210 may store/output a determined driver identity, vehicle identity, and/or other driving factors (e.g., weather, season, traffic, etc.). For example, a successful comparison between a current driving pattern and previously stored driving pattern may allow a movement data analysis application on a server 210 or a mobile device 220 to determine that the current driving trip has been driven by a specific driver, using a specific vehicle, and/or in certain weather, traffic, time, or other driving conditions.

Additional data may be stored/output in step 308 corresponding to other driving data characteristics not directly related to the driving pattern. For example, one or more measurements of accident-free driving, safe driving, or unsafe driving may be determined for the driving trip, based on factors such as the detection of a vehicle impact, air bag deployment, skidding or swerving, average driving speed, use of seatbelts, turn signals and other vehicle controls, traffic and weather conditions, detections of tailgating, intoxication, moving violations, and other safe or unsafe driving behaviors. Additional driving data stored/output in step 308 may relate to the times and locations driven, choices of routes taken, radio stations listened to, and any other factors relating to driving behaviors or driver preferences.

The driving data stored/output in step 308, when associated with the corresponding driver and/or vehicle data may have many different applications and may be provided to many different entities. For example, after comparing and matching driving patterns in step 305 to determine a specific driver, then additional driving data from the driving trip may be collected and transmitted to various entities and used for various different purposes, such as vehicle or driver insurance or financing (e.g., driving data indicating safe or unsafe driving), law enforcement (e.g., driving data indicating moving violations), and product retail or marketing entities (e.g., driving data indicating a driver's driving behaviors and habits, such as radio stations and ads listened to, routes driven and stops made, etc.).

To illustrate, in certain examples the movement data/driving data analysis server 210 may correspond to an insurance company server. In such examples, the insurance company may operate a movement data analysis software application 211, and may distribute corresponding software applications 222 to customers or potential customers of the insurance company. Databases 212 and/or 225 may be used to store driving patterns of insurance customers, for example, database 225 may store driving patterns only for those customers associated with mobile device 220 (e.g., driver-vehicle patterns for the customer/primary device owner, family members, friends, etc.), while database 212 may store a repository of driving patterns for all customers of the insurance company and/or other drivers of other insurance companies. In these examples, the data stored/output in step 308 may allow the insurance company server 210 to identify a customer (or potential customer) as a driver of a particular driving trip (e.g., even if a customer is not driving his/her own vehicle), and then use the corresponding driving data to detect accidents and determine safe or unsafe driving by the customer. Such determinations may allow the insurance company to adjust the customer's driver score, offer insurance rate discounts, suggest new insurance plans and products that may be advantageous based on the customer's driving habits, etc. Although this example relates to an insurance company, it should be understood that similar systems may be implemented by banks and financial institutions, law enforcement and governmental entities, and various retail entities, to offer targeted products, services, or incentives based on driving data.

As discussed above in reference to FIG. 3, the receipt and analysis of movement data, identification of driving patterns, and determination of associated drivers based on driving pattern matching, may be performed entirely by either a movement data/driving data analysis server 210 or by a mobile device 220 executing a movement data analysis software application 211 or 222. For example, driving pattern determination data and a repository of driving patterns may be transmitted to and/or stored by a mobile device 220, so that the mobile device can perform the driving pattern matching without needing to communicate with any external server. Alternatively, server 210 may be configured to receive and analyze movement data from various mobile devices 220, and entirely perform the driving pattern identification and pattern matching while only using the mobile devices 220 to collect the raw movement data.

In an aspect of the disclosure, driving data analysis server 210 may update one or more driver records based on the driving data associated with the first driving trip. For example, if the driving data analysis server 210 corresponds to an insurance provider server 210, then updated driver records may include updating the driver's driver score, offering insurance rate discounts, or suggesting new insurance plans and products that may be advantageous to the driver, based on the received driving data. For instance, existing insurance customers may be offered rate discounts or credits based on the received driving data, while non-customers may be offered specific insurance products and rate quotes as incentives to sign up for a new policy, based on the received driving data. Additionally, although these examples relate to driver records updated by an insurance company, it should be understood that similar systems may be implemented by banks and financial institutions, law enforcement and governmental entities, and various retail entities, to maintain driver data and offer targeted products, services, or incentives based on driving data.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A method comprising:
    training, based on training movement data associated with a mobile communication device and collected during a training period, a movement data analysis software application;
    storing, during the training period and based on the training movement data, one or more driving patterns; and
    after the training period, executing the movement data analysis software application as a background application to cause the mobile communication device to:
        receive, from a plurality of movement sensors of the mobile communication device, current movement data comprising movement of the mobile communication device and a time of day collected by a timing device;
        output, based on comparing the current movement data to the one or more stored driving patterns, an identification of a driver of a vehicle; and
        display, on a display of the mobile communication device, targeted content comprising at least one safe driving product offered to the driver of the vehicle based upon the current movement data and the identification of the driver of the vehicle.

2. The method of claim 1 wherein the plurality of movement sensors of the mobile communication device comprises at least one of: an accelerometer, a compass, or a gyroscope.

3. The method of claim 1 wherein the current movement data comprises at least one of: a speed, a distance traveled, a rate of acceleration, a rate of deceleration, or specific instances of rapid changes in movement of the mobile communication device.

4. The method of claim 1 wherein the movement data analysis software application causes the mobile communication device to:
    receive, from an on-board diagnostics (OBD) system, vehicle movement data of the vehicle associated with the driver, and wherein the output of the identification of the driver of the vehicle is further based on the vehicle movement data of the vehicle associated with the driver.

5. The method of claim 4 wherein the vehicle movement data comprises at least one of: a speed, a distance traveled, a rate of acceleration, a rate of deceleration, or specific instances of rapid changes in movement of the vehicle.

6. The method of claim 4 wherein the vehicle movement data comprises at least one of: a headlight usage, a brake light operation, a door opening and closing, a door locking and unlocking, a cruise control usage, a hazard lights usage, a windshield wiper usage, a horn usage, a turn signal usage, a seat belt usage, a phone and radio usage within the vehicle, or a maintenance performed on the vehicle.

7. The method of claim 4 wherein vehicle movement data comprises at least one of: an engine status, an oil level, an engine coolant temperature, an odometer reading, a level of fuel in a fuel tank, a level of charge in a battery, an engine revolutions per minute, or a tire pressure of the vehicle.

8. The method of claim 1 wherein the current movement data further comprises at least one of: a type of vehicle, a number of passengers in the vehicle, a location of the vehicle, or a time of year.

9. The method of claim 1 wherein the movement data analysis software application causes the mobile communication device to:
    exclude at least a portion of the received current movement data prior to comparing the current movement data to the one or more stored driving patterns.

10. The method of claim 1 wherein the movement data analysis software application causes the mobile communication device to:
    receive additional current movement data from one or more external sensors, and wherein the output of the identification of the driver of the vehicle is further based on the additional current movement data.

11. The method of claim 10 wherein the one or more external sensors comprise at least one of: a non-vehicle based traffic camera or a road-side traffic monitoring device.

12. An apparatus comprising:
    a plurality of movement sensors to gather movement data;
    a processor; and
    memory storing computer-executable instructions that, when executed by the processor, cause the apparatus to perform:
        training, based on training movement data associated with the apparatus and collected during a training period, a movement data analysis software application;
        storing, during the training period and based on the training movement data, one or more driving patterns;
        after the training period, executing the movement data analysis software application as a background application:
            receiving, from the plurality of movement sensors, current movement data comprising movement of the apparatus and a time of day collected by a timing device;
            outputting, based on comparing the current movement data to the one or more stored driving patterns, an identification of a driver of a vehicle; and
            displaying, on a display screen of the apparatus, targeted content comprising at least one safe driving product offered to the driver of the vehicle based upon the current movement data and the identification of the driver of the vehicle.

13. The apparatus of claim 12 wherein the plurality of movement sensors comprises at least one of: an accelerometer, a compass, or a gyroscope.

14. The apparatus of claim 12 wherein the current movement data comprises at least one of: a speed, a distance traveled, a rate of acceleration, a rate of deceleration, or specific instances of rapid changes in movement of the apparatus.

15. The apparatus of claim 12 wherein the memory further comprises computer-executable instructions that, when executed by the processor, cause the apparatus to perform:
    receiving, from an on-board diagnostics (OBD) system of the vehicle, vehicle movement data, and
    wherein the output of the identification of the driver of the vehicle is further based on the vehicle movement data.

16. The apparatus of claim 15 wherein the vehicle movement data comprises at least one of: a speed, a distance traveled, a rate of acceleration, a rate of deceleration, or specific instances of rapid changes in movement of the vehicle.

17. The apparatus of claim 12 wherein the current movement data further comprises at least one of: a type of vehicle, a number of passengers in the vehicle, a location of the vehicle, or a time of year.

18. The apparatus of claim 12 wherein the memory further comprises computer-executable instructions that, when executed by the processor, cause the apparatus to perform:
   excluding at least a portion of the received current movement data prior to comparing the current movement data to the one or more stored driving patterns.

19. The apparatus of claim 12 wherein the memory further comprises computer-executable instructions that, when executed by the processor, cause the apparatus to perform:
   receiving additional current movement data from one or more external sensors, and wherein the output of the identification of the driver of the vehicle is further based on the additional current movement data.

20. The apparatus of claim 19 wherein the one or more external sensors comprise at least one of: a non-vehicle based traffic camera or a road-side traffic monitoring device.

\* \* \* \* \*